United States Patent
Karmon et al.

(10) Patent No.: US 9,870,063 B2
(45) Date of Patent: Jan. 16, 2018

(54) MULTIMODAL INTERACTION USING A STATE MACHINE AND HAND GESTURES DISCRETE VALUES

(71) Applicant: Microsoft Technology Licensing, LLC, Redmond, WA (US)

(72) Inventors: Kfir Karmon, Petach-Tikva (IL); Adi Diamant, Shoham (IL); Karen Master Ben-Dor, Kfar-Saba (IL); Eyal Krupka, Shimshit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/985,716

(22) Filed: Dec. 31, 2015

(65) Prior Publication Data

US 2017/0192512 A1    Jul. 6, 2017

(51) Int. Cl.
| | |
|---|---|
| *G06F 3/041* | (2006.01) |
| *G06F 3/01* | (2006.01) |
| *G06F 17/30* | (2006.01) |
| *G06F 3/16* | (2006.01) |
| *G06F 3/03* | (2006.01) |
| *G06F 3/038* | (2013.01) |
| *G06K 9/00* | (2006.01) |

(52) U.S. Cl.
CPC ............ *G06F 3/017* (2013.01); *G06F 3/0304* (2013.01); *G06F 3/038* (2013.01); *G06F 3/0416* (2013.01); *G06F 3/167* (2013.01); *G06F 17/30964* (2013.01); *G06K 9/00355* (2013.01); *G06K 9/00362* (2013.01); *G06K 9/00375* (2013.01); *G06K 9/00389* (2013.01); *G06F 2203/0381* (2013.01)

(58) Field of Classification Search
CPC ........ G06F 3/017; G06F 3/0416; G06F 3/167; G06F 17/30964
See application file for complete search history.

(56) References Cited

U.S. PATENT DOCUMENTS

2010/0281435 A1   11/2010   Bangalore et al.

OTHER PUBLICATIONS

International Search Report and the Written Opinion dated Mar. 23, 2017 From the International Searching Authority Re. Application No. PCT/US2016/067893.

(Continued)

*Primary Examiner* — Jonathan Boyd

(57) ABSTRACT

A system for associating between a computerized model of multimodal human interaction and application functions, comprising:
(a) An interface for receiving instructions from a programmer defining one or more application functions.
(b) A memory storing hand gestures each defined by a dataset of discrete pose values and discrete motion values.
(c) A code store storing a code.
(d) One or more processors coupled to the interface, the memory and the code store for executing the stored code which comprises:
 (1) Code instructions to define a logical sequence of user input per instructions of the programmer. The logical sequence combines hand gestures with non-gesture user input.
 (2) Code instructions to associate the logical sequence with the application function(s) for initiating an execution of the application function(s) during runtime of the application in response to detection of the logical sequence by analyzing a captured data depicting a user during runtime.

18 Claims, 12 Drawing Sheets

(56) References Cited

OTHER PUBLICATIONS

Bourguet "A Toolkit for Creating and Testing Multimodal Interface Designs", User Interface Software & Technology, Compagnion Proceedings of UIST'02, XP055351257, Poster, p. 29-30, Oct. 30, 2002. Abstract, p. 29, r-h col.-p. 30, 1-h col.
Written Opinion Dated Sep. 20, 2017 From the International Preliminary Examining Authority Re. Application No. PCT/US2016/067893. (8 Pages).

MULTIMODAL INTERACTION USING A STATE MACHINE AND HAND GESTURES DISCRETE VALUES

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (U.S. patent application Ser. No. 14/985,691, filed on Dec. 31, 2015), "RECOGNITION OF HAND POSES BY CLASSIFICATION USING DISCRETE VALUES" (U.S. patent application Ser. No. 14/985,741, filed on Dec. 31, 2015, now U.S. Pat. No. 9,734,435), "TRANSFORM LIGHTWEIGHT SKELETON AND USING INVERSE KINEMATICS TO PRODUCE ARTICULATE SKELETON" (U.S. patent application Ser. No. 14/985,777, filed on Dec. 31, 2015), "STRUCTURE AND TRAINING FOR IMAGE CLASSIFICATION" (U.S. patent application Ser. No. 14/985,803, filed on Dec. 31, 2015), "TRANSLATION OF GESTURE TO GESTURE CODE DESCRIPTION USING DEPTH CAMERA" (U.S. patent application Ser. No. 14/985,804, filed on Dec. 31, 2015), "GESTURES VISUAL BUILDER TOOL", "ELECTRICAL DEVICE FOR HAND GESTURES DETECTION" (U.S. patent application Ser. No. 14/985,728, filed on Dec. 31, 2015) and "DETECTION OF HAND GESTURES USING GESTURE LANGUAGE DISCRETE VALUES" (U.S. patent application Ser. No. 14/985,680, filed on Dec. 31, 2015), the disclosures of which are incorporated herein by reference.

BACKGROUND

Multimodal interaction is mostly the natural interaction humans use to interact with the world and his surroundings in general and among humans in particular. Multimodal interaction may employ various human senses, for example, visual interaction, text interaction, and/or voice interaction, tactile interaction. The multimodal interaction may include one or more interaction types sequentially or in parallel to, for example, express needs, share information, explore options and the likes. Multimodal interaction is known to provide a rich interaction information environment where one or more human senses are used to interpret interaction with other people. For example, facial expressions, body language and/or voice intonation, may provide a lot of information to a person while communicating with one or more other people in addition to the actual contents of the verbal language. Human machine interaction (HMI) on the other hand is traditionally confined to unimodal or limited multimodal at best, for example, using switches, buttons, keyboard and/or pointing devices for inputting data to the machine and receiving from the machine text, visual objects displayed on a screen and/or audio playback. Bringing the wealth of information available by the human multimodal interaction to the HMI environment may provide major benefits, for example, improve the accuracy of the interaction interpretation by analyzing multimodal data generated by a plurality of senses, support hands free interaction, eliminate and/or reduce the need for intermediate devices, such as keyboard, pointing device and/or touchscreen and/or improve HMI for limited accessibility people.

SUMMARY

According to some embodiments of the present disclosure, there are provided systems and methods for defining one or more multimodal acts for controlling one or more application functions of one or more applications by generating a multimodal sequence comprising one or more hand gestures and one or more no-gesture user input data. The multimodal sequence may include one or more hand gestures and one or more non-gesture input data received from a user, for example, text input, voice input, tactile input, lips movement, eyes gaze data and the likes. The one or more multimodal sequence may be implemented as for example, a multimodal finite state machine (FSM) which includes one or more multimodal actions. Each hand gesture of the multimodal act is created as a gesture sequence which in turn may be implemented as for example, a gesture FSM which includes one or more hand poses and/or hand motions each defined by a dataset of discrete pose values and discrete motion values respectively. The one or more multimodal acts may be associated with one or more application functions of one or more applications so as to trigger execution of the one or more application functions during runtime at the detection of the associated multimodal act. Definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s).

The multimodal act may be identified, recognized and/or classified using one or more capturing devices which monitor interaction of a user, for example, an imaging device(s), a sound recorder(s), a tactile input device, a text input device(s) such as a keyboard, a digital pen, a touchpad and the likes, a touchscreen(s), a digital surface(s) and/or a pointing device(s) such as a mouse, a trackball, a game controller, a joystick and the likes. The captured user interaction, for example, hand gestures, head gestures, body gestures, facial expression, gaze direction, text, voice, and/or tactile input may be processed to identify the one or more multimodal acts. The hand gestures may play a major part in the multimodal act as hand gestures are one of the main methods for people to express themselves. Adding to the hand gestures the one or more multimodal non-gesture user interaction may provide a context within which the one or more hand gestures take place thus improving identification, recognition and/or classification accuracy of the one or more hand gestures. By implementing the hand gestures as structures of discrete pose and motion values the gestures construction as well as gestures recognition (as part of the multimodal act) is made simple, avoiding the use of machine learning and computer vision processing by the application. The hand gestures creation, identification, recognition and/or classification are performed by, for example a gesture library which may include a gesture API for attaching to the application. The programmer may use previously defined hand gestures and/or construct custom hand gestures to be used for triggering the one or more application functions.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
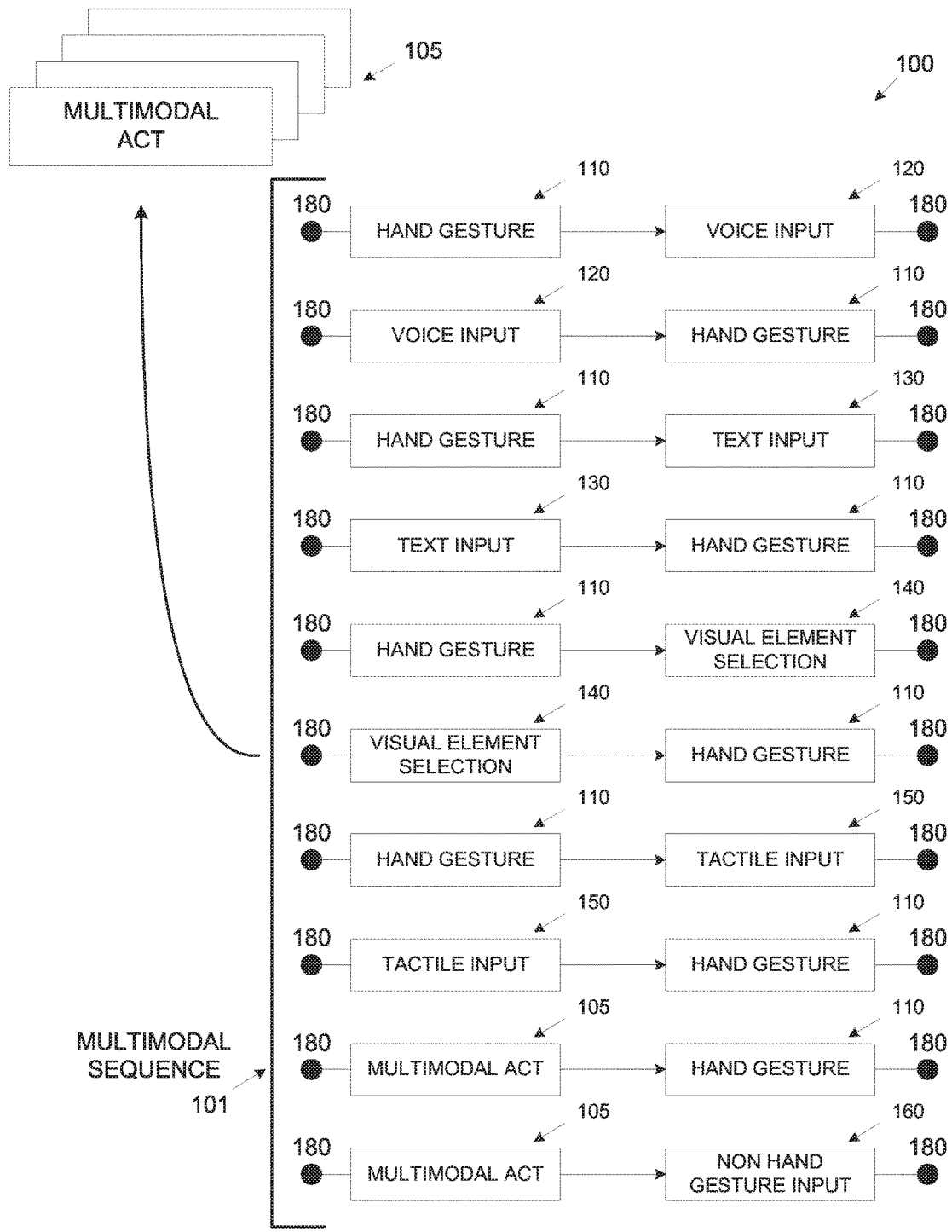
FIG. 1 is a block diagram of the building blocks of exemplary multimodal acts, according to some embodiments of the present disclosure.

According to some embodiments of the present disclosure, there are provided systems and methods for defining one or more multimodal acts for controlling one or more application functions of one or more applications by generating a multimodal sequence comprising one or more hand gestures and one or more non-gesture user input data. The multimodal sequence may include one or more hand gestures and one or more non-gesture input data received from a user, for example, text input, voice input, tactile input, lips movement, eyes gaze data and the likes.

The one or more multimodal sequence may be implemented as, for example, a multimodal FSM which includes one or more multimodal actions. The one or more hand(s) gestures which are part of the one or more multimodal acts are constructed using gesture datasets one or more of a plurality of discrete pose values and discrete motion values. The discrete pose and motion values each represent a value of a specific pose feature (characteristic) of a hand(s) and/or motion feature of the hand respectively. The hand pose features may include for example, a hand selection (left, right, both), a hand direction, a hand rotation, a finger position (per finger), a finger tangency (per two or more fingers) and/or a finger relative location (per two or more fingers). The hand motion features may include for example, motion properties such as, for example, size, speed, range and/or location in space and/or motion script(s) which define the motion shape. The dataset of the hand gesture is arranged as a logical sequence of one or more hand poses and/or hand motions each defined by one or more of the discrete pose values and discrete motion value respectively. Continuous values of the one or more hand pose features and/or hand motion features may be represented by discrete pose values and/or discrete motion values respectively by quantizing the continuous values to support the discrete architecture of the hand gesture generation, detection and/or classification.

The logical sequence of one or more of the hand gestures may be implemented by, for example, a gesture FSM. A hand gesture may refer to one or more hand poses and/or hand motions performed by a single hand (right or left) and/or by both hands. Each hand is assigned a dedicated instance of the dataset of poses and/or motions features so that the one or more hand gestures of each hand may be separately constructed, classified, recognized and/or identified. However for brevity, reference hereinafter is made to hand gesture to address hand gestures of one and/or both hands.

The multimodal acts and/or parts thereof may be predefined in advance and inputted into, for example, a multimodal library comprising a plurality of multimodal acts allowing a programmer to associate the one or more multimodal acts with one or more application functions. The multimodal library may employ a multimodal application programming interface (API) and/or one or more code instructions to expose the one or more multimodal acts to the programmer. Optionally, the API enables the programmer to create custom multimodal acts by defining a custom logical sequence of one or more hand gestures and one or more non-gesture user input data.

The programmer's application may be executed on one or more computerized devices, for example, computer, mobile device, computerized machine and/or computerized appliance equipped and/or attached to one or more user interaction recognition devices, for example, an imaging device(s), an audio recorder(s), a tactile reception device(s), a text input device(s) and/or a pointing device(s). The one or more user interaction recognition devices monitor the user's interaction during runtime, for example, hand(s) movement, head movement, body movement, facial expression, gaze direction, voice and/or hand(s) and/or legs pressure. The captured user interaction is processed to identify the one or more multimodal acts. Once the one or more multimodal acts are identified, a trigger is initiated to initiate the one or more associated application functions.

The multimodal acts may be classified and/or identified during runtime by employing one or more image analysis processes to identify and/or classify the logical sequences such as, for example, the multimodal FSM of the one or more multimodal acts. The one or more image analysis processes may include, for example, discriminative fern ensemble (DFE) and/or discriminative tree ensemble (DTE).

The multimodal and specifically the hand gestures construction, recognition, identification and/or classification as described in some embodiments of the present disclosure enables the programmer to define the HMI with high expressiveness while maintaining simplicity. The hand gestures may be operation oriented to simplify their construction, classification and/or identification since each of the hand gestures may distinctively target a specific operation thus avoiding the need to perform extensive modeling and/or analysis of hand(s) movement of a user to identify the one or more hand gestures. Furthermore, the multimodal act provides a context in which the one or more hand gesture is performed, making classification and/or identification easier.

Due to the discrete construction of the hand gestures, construction, recognition, identification and/or classification do not require processor intensive platform(s) thus dramatically reducing computation costs. No computer learning and/or computer vision processing may be required of the programmer's application using the multimodal acts for initiating application functions thus reducing the application complexity. Hand gestures, construction, recognition, identification and/or classification are done by a gesture library and/or a gesture module which employs a gesture API to allow the programmer to attach to the hand gestures. Machine learning and/or computational complexity of computer vision processing is greatly reduced due to the discrete definition of the hand gestures. Furthermore, this approach allows the programmer great flexibility in designing the application and the multimodal act(s) to be used within the application. Moreover, as each application may consist of limited number multimodal acts, each represented with a unique multimodal FSM, for example 10, 50, 100 and/or any intermediate number of multimodal acts, a statistical identification of a hand gesture within a multimodal act may be limited to a small number of possibilities.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a block diagram of the building blocks of exemplary multimodal acts, according to some embodiments of the present disclosure. Illustration 100 depicts several construction schemes of exemplary multimodal acts 105. The multimodal acts 105 may be created through one or more possible constructions, for example:

(a) The multimodal act 105 may be a combination and/or sequence of a hand gesture 110 a voice input 120.
(b) The multimodal act 105 may be a combination and/or sequence of the voice input 120 and the hand gesture 110.
(c) The multimodal act 105 may be a combination and/or sequence of the hand gesture 110 and a text input 130.
(d) The multimodal act 105 may be a combination and/or sequence of the text input 130 and the hand gesture 110.
(e) The multimodal act 105 may be a combination and/or sequence of the hand gesture 110 and a visual element selection 140.
(f) The multimodal act 105 may be a combination and/or sequence of the visual element selection 140 and the hand gesture 110.
(g) The multimodal act 105 may be a combination and/or sequence of the hand gesture 110 and a tactile input 150.
(h) The multimodal act 105 may be a combination and/or sequence of the tactile input 150 and the hand gesture 110.
(i) The multimodal act 105 may be a combination and/or sequence of another multimodal act 105 and one of the hand gestures 110.
(j) The multimodal act 105 may be a combination and/or sequence of another multimodal act 105 and a non-gesture input 160, for example, the voice input 120, the text input 130, the visual element, selection 140 and/or the tactile input 150.

The multimodal act 105 may be created through multiple iterations of the constructions (i) and/or (j) above. Each multimodal act 105 is constructed as a unique combination and/or sequence is represented by a multimodal sequence 101 which comprises of one or more of the multimodal actions, for example, the hand gesture 110, the voice input 120, the text input 130, the visual element, selection 140, the tactile input 150 and the multimodal act 105. Each of the multimodal acts 105 starts and ends with an idle state 180 which is a virtual state identifying the start and/or end of the unique multimodal sequence 101 of the multimodal act 105. The one or more multimodal actions which constitute the multimodal sequence 101 may be defined to occur in sequence and/or in parallel to one another. The one or more hand gestures 110 and the one or more non-gesture input 160 may provide context to each other thus making recognition and/or classification of the hand gestures 110 and the non-gesture input 160 easier as there are fewer possible hand gestures 110 and/or non-gesture input 160 candidates which are valid for a specific sequence. For example, in case the multimodal act 105 includes a voice input such as the voice input 120 that specifies a text related application function, only hand gestures 110 relating to text manipulation may be considered during classification.

Figure 2:
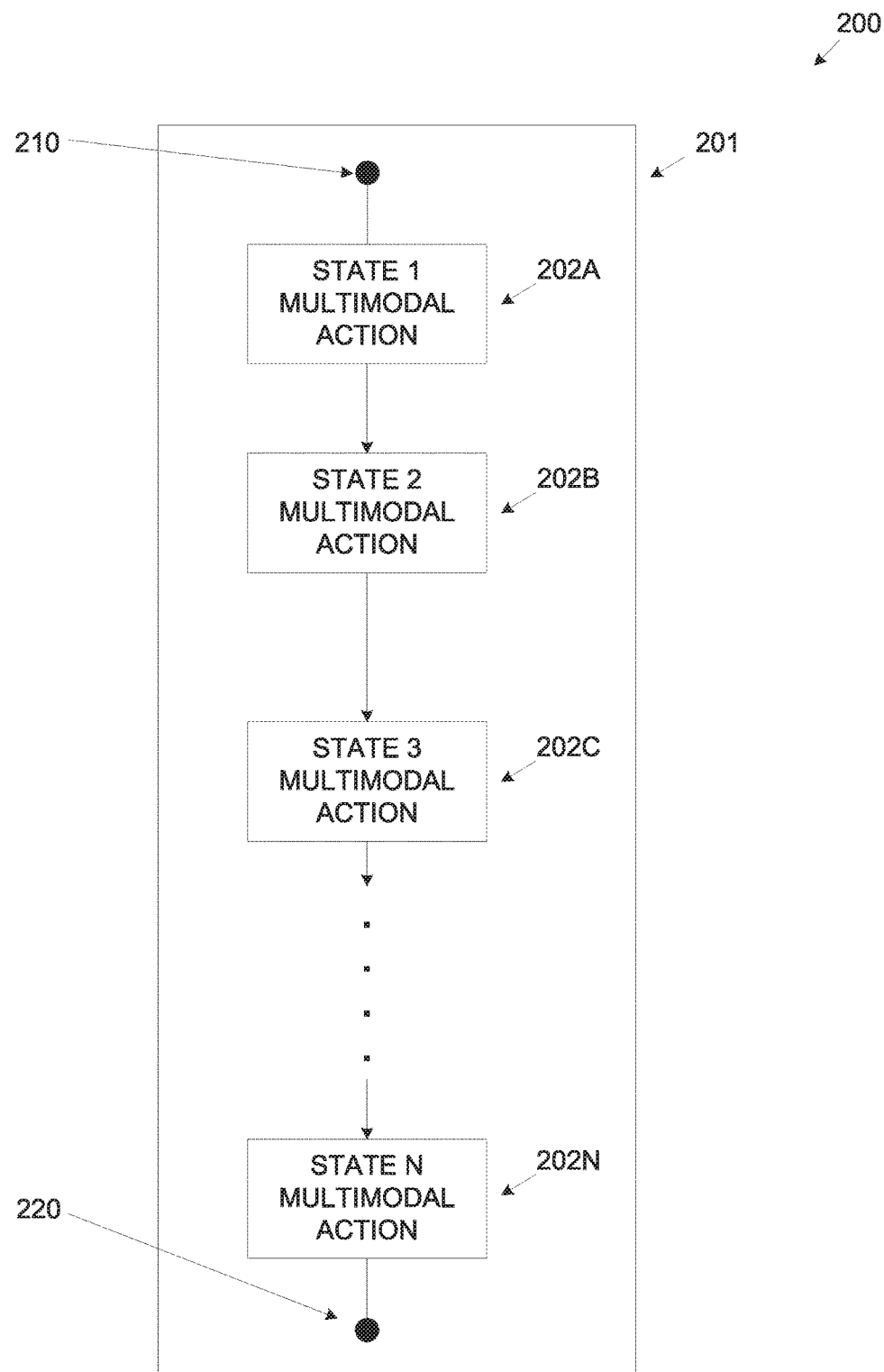
FIG. 2 is a schematic illustration of a multimodal FSM defining a multimodal act, according to some embodiments of the present disclosure.

Reference is now made to FIG. 2 which is a schematic illustration of a multimodal FSM defining a multimodal act, according to some embodiments of the present disclosure. An illustration 200 depicts a multimodal FSM 201 which may represent a multimodal sequence such as the multimodal sequence 101 defining a multimodal act such as the multimodal act 105. The multimodal FSM 201 may represent one or more multimodal actions, for example, hand gestures such as the hand gestures 110 and/or non-gesture input such as the non-gesture input 160. The multimodal FSM 201 starts with a start point 210 which may be a virtual state indicating an idle state of the FSM 201 and may include one or more states 202A, 202B, 202C through 202N. Each of the states 202A-202N may represent one of the hand gestures 110 and/or the non-gesture input 160. The FSM 201 is ended with an FSM end point 220 which identified the completion of the multimodal sequence 101 at which point an associated one or more application functions and/or actions are initiated. The start point 210 and/or the end point 220 may be defined by a virtual idle state such as the idle state 180. Optionally, any transition between one or more of the multimodal FSM states 202A-202N may trigger an event which may be logged by a system and/or operating system (OS) and used for one or more of a plurality of uses, for example, use of the application (the application which includes the associated one or more application functions), use of other one or more applications and/or use of the OS controlling the execution environment. Optionally, the FSM 201 may be constructed to represent a complex multimodal act such as the multimodal acts 105 by including repetitions of one or more of the states 202A-202N, splitting to several parallel and/or sequential paths and/or combining two or more FSMs 201 and/or parts thereof. Defining the multimodal sequence 101 as the multimodal FSM 201 may allow easy recognition, identification and/or classification of the one or more multimodal acts 105 and more specifically of the one or more hand gestures 110 included in the multimodal act 105 since each of the hand gestures 110 is constructed of a finite number of states each constructed of hand pose features record and/or hand motion features records that are easily identified. Recognition, identification and/or classification may be simplified because there is no need for the user application to perform hand skeleton modeling and/or employ computer learning for recognition, identification and/or classification of the hand gestures 110. Furthermore computer learning and/or computer vision processing which are performed by a gesture library and/or gesture module employing one or more analysis processes such as, for example DFE and/or DTE which is made simple due to their discrete construction of the hand gestures 110.

Figure 3:
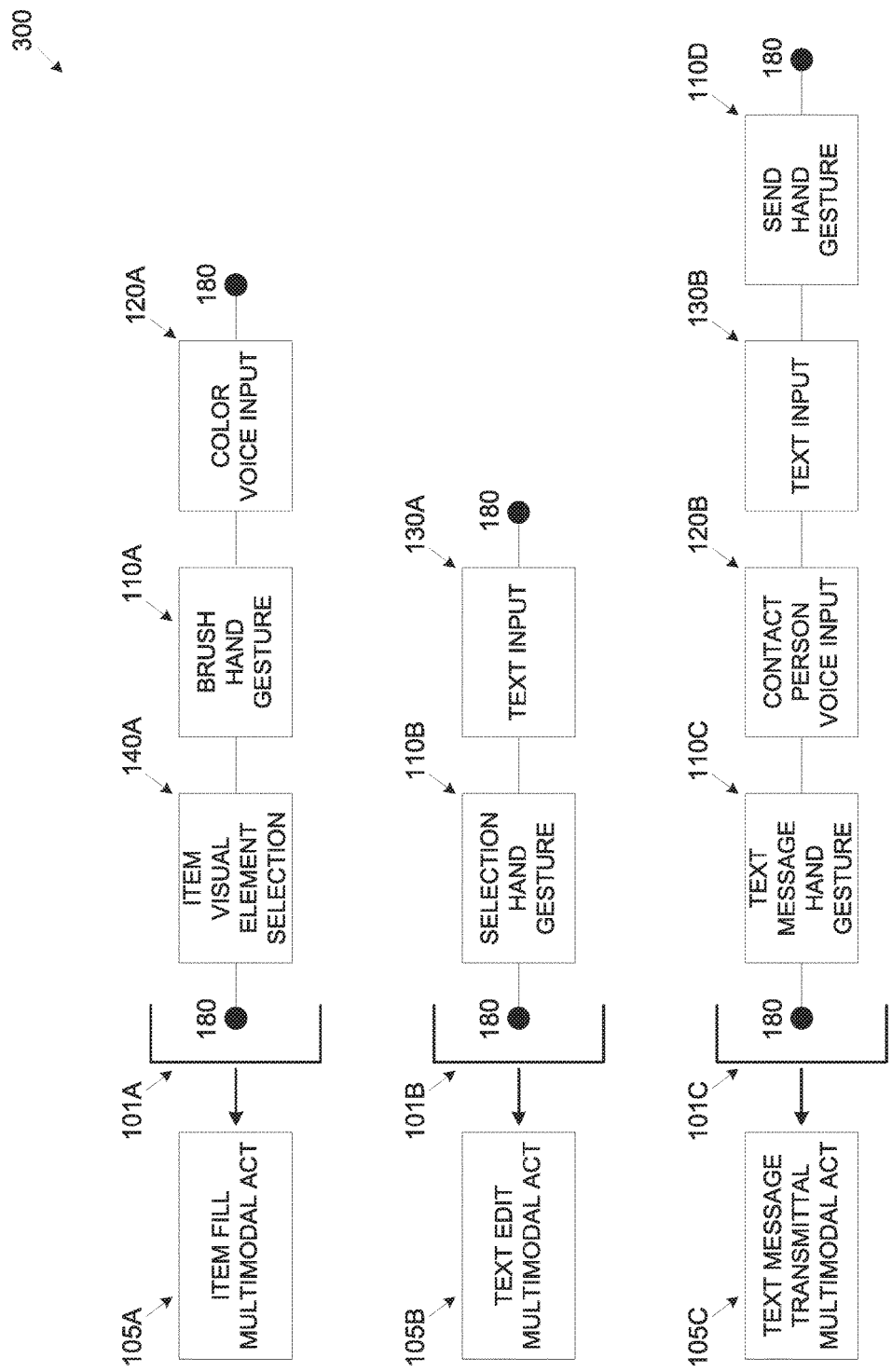
FIG. 3 is a is a schematic illustration of exemplary multimodal acts, according to some embodiments of the present disclosure.

Reference is now made to FIG. 3 which is a schematic illustration of exemplary multimodal acts, according to some embodiments of the present disclosure. An illustration 300 depicts 3 multimodal acts 105A, 105B and 105C such as the multimodal acts 105. Each of the multimodal acts 105A, 105B and 105C is defined by a multimodal sequence such as the multimodal sequence 101, where a multimodal sequence 101A defines the multimodal act 105A, multimodal sequence 101B defines the multimodal act 105B and multimodal sequence 101C defines the multimodal act 105C. Each of the multimodal sequences 101A, 101B and 101C starts and ends with an idle state such as the idle state 180 identifying the start and the end of the multimodal acts 105A, 105B and 105C respectively.

The multimodal act 105A is associated with an item fill application function in, for example, a drawing tool application. As shown, the multimodal sequence 101A includes 3 multimodal actions—an item visual element selection 140A, a brush hand gesture 110A and a color voice input 120A. The item visual element selection 140A is defined to identify an item in the drawing area of the drawing tool application. The item visual element selection 140A may be utilized, for example, as selection of an item using, for example, a touchscreen, a digital surface and/or a pointing device. The brush hand gesture 110A defines a brush hand gesture, for example, swinging an open hand from left to right which is associated with an item fill application function relating to the item selected by the item visual element selection 140A. The color voice input 120A identifies the color, for example blue which is used to fill the item selected by the item visual element selection 140A. The outcome of the multimodal act 105A is the item selected by the item visual element selection 140A is filled with blue color.

The multimodal act 105B is associated with a text edit application function in, for example, a text editor application. As shown, the multimodal sequence 101B includes 2 multimodal actions—a selection hand gesture 110B and a text input 130A. The selection hand gesture 110B defines a selection hand gesture, for example, moving a pointing index finger across a text presented on a screen by or example, the text editing application to select a text location which needs editing. The text input 130A is used to type in the new and/or modified text at the location identified by the selection hand gesture 110B. The outcome of the multimodal act 105B is the text selected by the selection hand gesture 110B is updated with the text indicated by the text input 130A.

The multimodal act 105C is associated with a text message transmittal item application function using, for example, a text messaging application. As shown, the multimodal sequence 101C includes 4 multimodal actions—a text message hand gesture 110C, a contact person voice input 120B, a text input 130B and a send hand gesture 110D. The text message hand gesture 110C, for example, making a scribble motion and thrusting the hand left is defined to initiate a text messaging application. The contact person voice input 120B is defined to select a contact person from a contact list of the text messaging application. The text input 130B is used to type in the message text. The send hand gesture 110D, for example, thrusting a hand to the right is defined to send the message to the contact person identified by the contact person voice input 120B.

Figure 4:
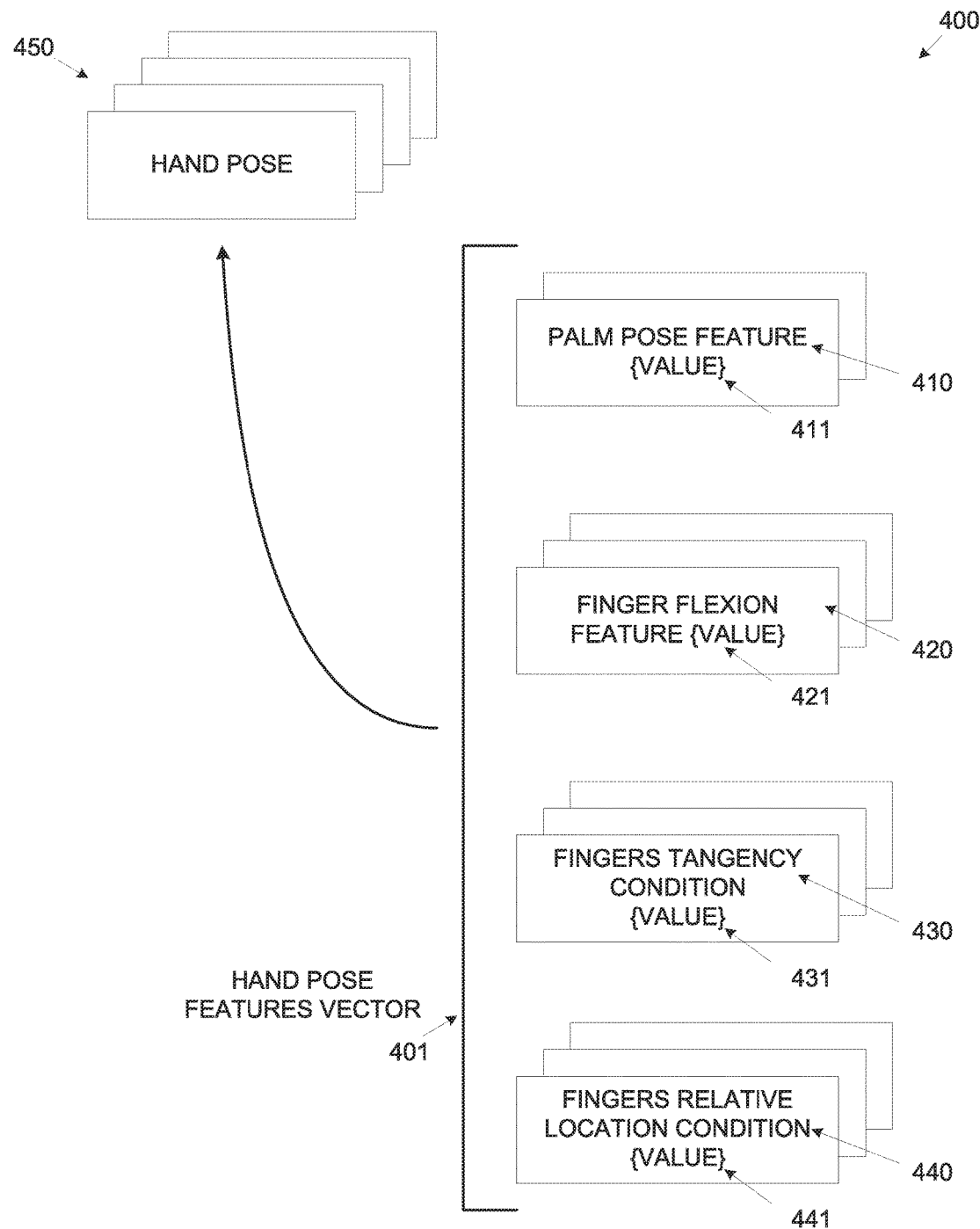
FIG. 4 is a schematic illustration of exemplary hand poses construction as part of a multimodal act, according to some embodiments of the present disclosure.

Reference is now made to FIG. 4 which is a schematic illustration of exemplary hand poses construction as part of a multimodal act, according to some embodiments of the present disclosure. Illustration 400 depicts exemplary hand poses 450 representations construction. Each of the hand poses 450 is represented as a hand pose features record 401 which includes one or more hand pose features 410, 420, 430 and/or 440. Each of the hand pose features may be assigned with one or more discrete pose value 411, 421, 431 and/or 441 which identify the state (value) of the respective hand pose feature 410, 420, 430 and/or 440 for an associated hand pose of the hand poses 450. The combination of the one or more discrete pose values 411, 421, 431 and/or 441 of the respective hand pose features 410, 420, 430 and 440 as defined by the hand pose features record 401 identifies a specific pose of the hand poses 450 which may be used by a programmer to create one or more hand gestures such as the hand gestures 110. Continuous values of the one or more hand pose features 410, 420, 430 and/or 440 may be represented by the discrete pose values 411, 421, 431 and/or 441 by quantizing the continuous values. The hand pose features record 401 may be represented as, for example, a features vector, a features matrix and/or a features table. The hand pose features record 401 may include values of one or more of the following hand pose features 410, 420, 430 and 440:

Palm pose features—one or more pose features 410 may include, for example, hand selection 410A, palm direction 410B, palm rotation 410C and/or hand location 410D. The hand selection feature 410A may identify which hand is active and may be defined by discrete pose values 411A such as, for example, right, left and/or both. The palm direction feature 410B may define the direction in which the palm of the active hand is facing and may be defined by discrete pose values 411B such as, for example, left, right, up, down, forward and/or backward. The palm rotation 410C may define the rotation state of the palm of the active hand and may include discrete pose values 411C such as, for example, left, right, up, down, forward and/or backward. The hand location feature 410D may identify the spatial location of the active hand in space and may be defined by discrete pose values 411D such as, center of field of view (FOV), right side of FOV, left side of FOV, top of FOV, bottom of FOV, front of FOV and/or rear of FOV. Where FOV is for example, the visible space of an imaging device monitoring the movement of the user's hand. Optionally, the hand location feature 410D is identified with respect to a fixed object present in the FOV, for example, keyboard and/or pointing device so that the hand location feature 410D may be defined by discrete pose values 411D such as, for example, above_keyboard, behind_keyboard, right_of_keyboard and/or left_of_keyboard.

Finger flexion features—one or more finger flexion features 420 which are defined per finger. For example, a finger flexion feature 420 may be a flexion and/or curve state which may be defined by one or more discrete pose values 421 such as, for example stretched, folded and/or open represented, for example by 0, 1, and 2. Each finger (thumb, index, middle, ring and/or pinky) may be assigned with one or more finger features 420, for example, {thumb, middle, ring, pinky} in {folded} state and {index} in {stretched} state.

Finger tangency condition features—one or more fingers tangency features 430 which may be defined per finger. The tangency feature 430 may identify a touch condition of any two or more fingers and/or touch type and may be defined by discrete pose values 431 such as, for example, not touching, fingertip and/or full touch.

Finger relative location condition features—one or more fingers relative location features 440 may be defined per finger. Each of the fingers relative location condition features 440 may identify a relative location of one finger in relation to one or more other fingers. The fingers relative location features 440 may be defined by discrete pose values 441 such as, for example, one or more fingers are located relatively to another one or more fingers to the left, right, above, below, inward, outward, in front and/or behind.

Each one of the hand poses 450 is defined by a unique one of the hand pose features records 401 which may be a combination and/or sequence of one or more discrete pose values 411, 421, 431 and/or 441 each providing a value of the corresponding hand pose feature 410, 420, 430 and/or 440. The hand pose features records 401 may include only some (and not all) of the discrete pose values 411, 421, 431 and/or 441 while other discrete pose values 411, 421, 431 and/or 441 which are not included are left free. For example, the hand pose features records 401 may define a specific state of the fingers (for example discrete pose values 421, 431 and/or 441) while the direction of the hand is left unspecified (for example discrete pose value 411). In this case the hand pose 450 is identified, recognized and/or classified in runtime at the detection of the fingers state as defined by the hand pose features records 401 with the hand facing any direction. Using the discrete pose values 411, 421, 431 and/or 441 allows for simple creation of the hand pose 450 as there is a finite number of discrete pose values 411, 421, 431 and/or 441 with which the hand pose 450 is created. For instance, the palm direction feature 410B included in the hand pose feature 410 may include up to six discrete pose values 411B—left, right, up, down, forward and backward. The discrete representation of the hand pose features 410, 420, 430 and/or 440 may not be limited to discrete values only. Continuous values of the one or more hand features 410, 420, 430 and/or 440 may be represented by discrete pose values 411, 421, 431 and/or 441 respectively by quantizing the continuous values. For example, the palm rotation palm pose feature 410C may be defined with 8 discrete pose values 411C1-411C6—0°, 45°, 90°, 135°, 180°, 225°, 270° and 315° to quantize the complete rotation range of 0°-360°. One or more hand poses 450 may be created and included in the one or more hand gestures 110 which may be used to create multimodal acts such as the multimodal acts 105.

Figure 5:
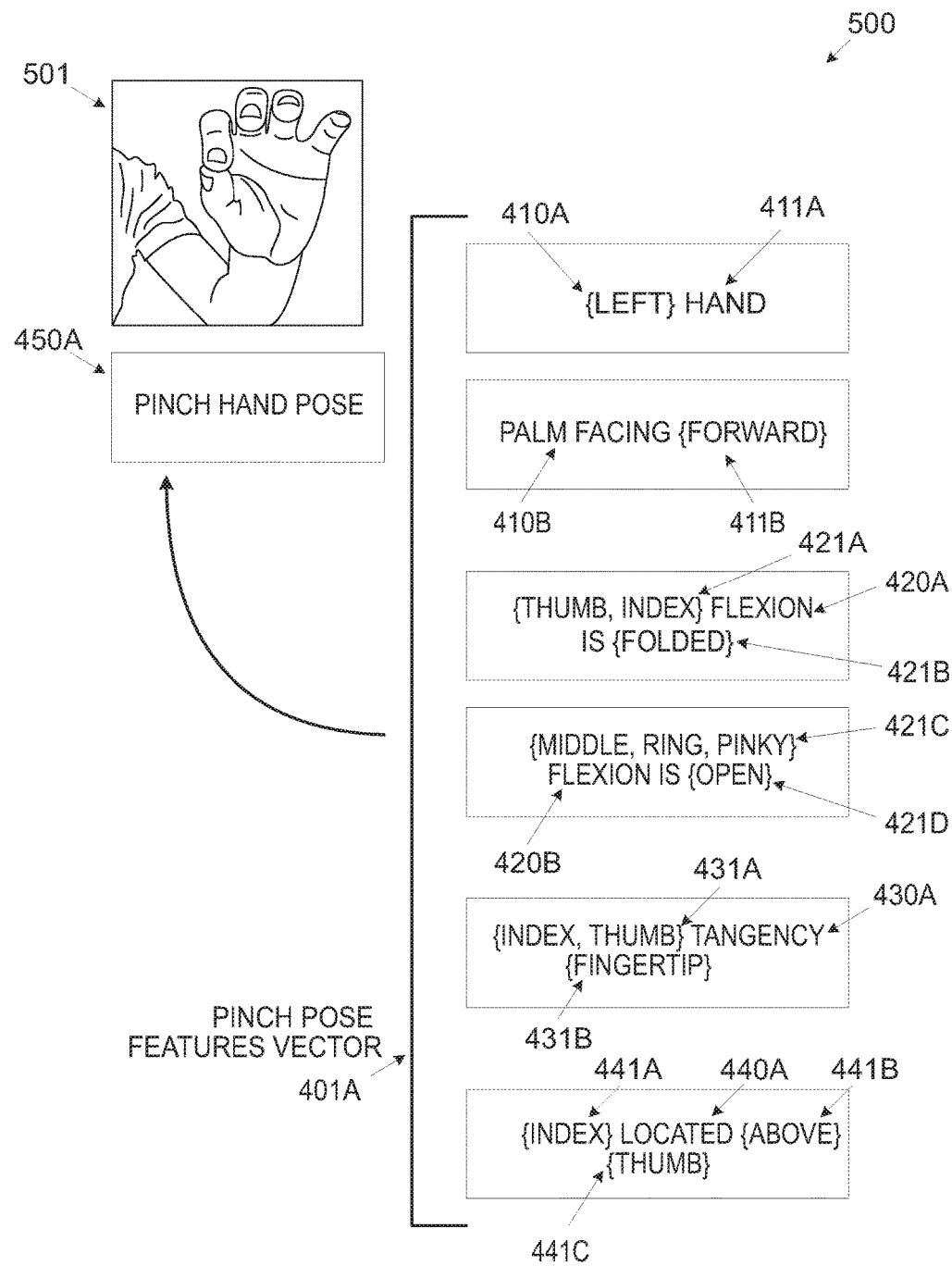
FIG. 5 is a schematic illustration of an exemplary pinch hand pose construction, according to some embodiments of the present disclosure.

Reference is now made to FIG. 5 which is a schematic illustration of an exemplary pinch hand pose construction, according to some embodiments of the present disclosure. Illustration 500 depicts an exemplary pinch hand pose 450A construction. The pinch hand pose 450A is represented by a pinch pose features record 401A comprising discrete pose values such as the discrete pose values 411, 421, 431 and/or 441, each indicating a value of a corresponding hand pose feature such as the hand pose features 410, 420, 430 and/or 440. The pinch hand pose 450A which is visualized through an image capture 501 is created with some of the plurality of discrete pose values 411, 421, 431 and/or 441 as follows:

A hand selection feature 410A is assigned a discrete pose value 411A to indicate the left hand is active.

A palm direction feature 410B is assigned a discrete pose value 411B to indicate the palm of the active hand is facing forward.

A fingers flexion feature 420A is assigned a discrete pose value 421A and a discrete pose value 421B to indicate the thumb and index fingers are folded.

A fingers flexion feature 420B is assigned a discrete pose value 421C and a discrete pose value 421D to indicate the middle, ring and pinky fingers are open.

A fingers tangency condition feature 430A is assigned a discrete pose value 431A and 431B to indicate the thumb and index fingers are touching at their tips.

A fingers relative location feature 440A is assigned a discrete pose value 441A, a discrete pose value 441B and a discrete pose value 441C to indicate the index finger is located above the thumb finger.

As seen above, the pinch hand pose 450A is uniquely defined by a pinch features pose features record 401A comprising the discrete pose values 411A-411B, 421A-421D, 431A-431B and 441A-441C corresponding to the hand pose features 410A-410B, 420A-420B, 430 and 440A respectively. Similarly additional hand poses 450 may be created.

Figure 6:
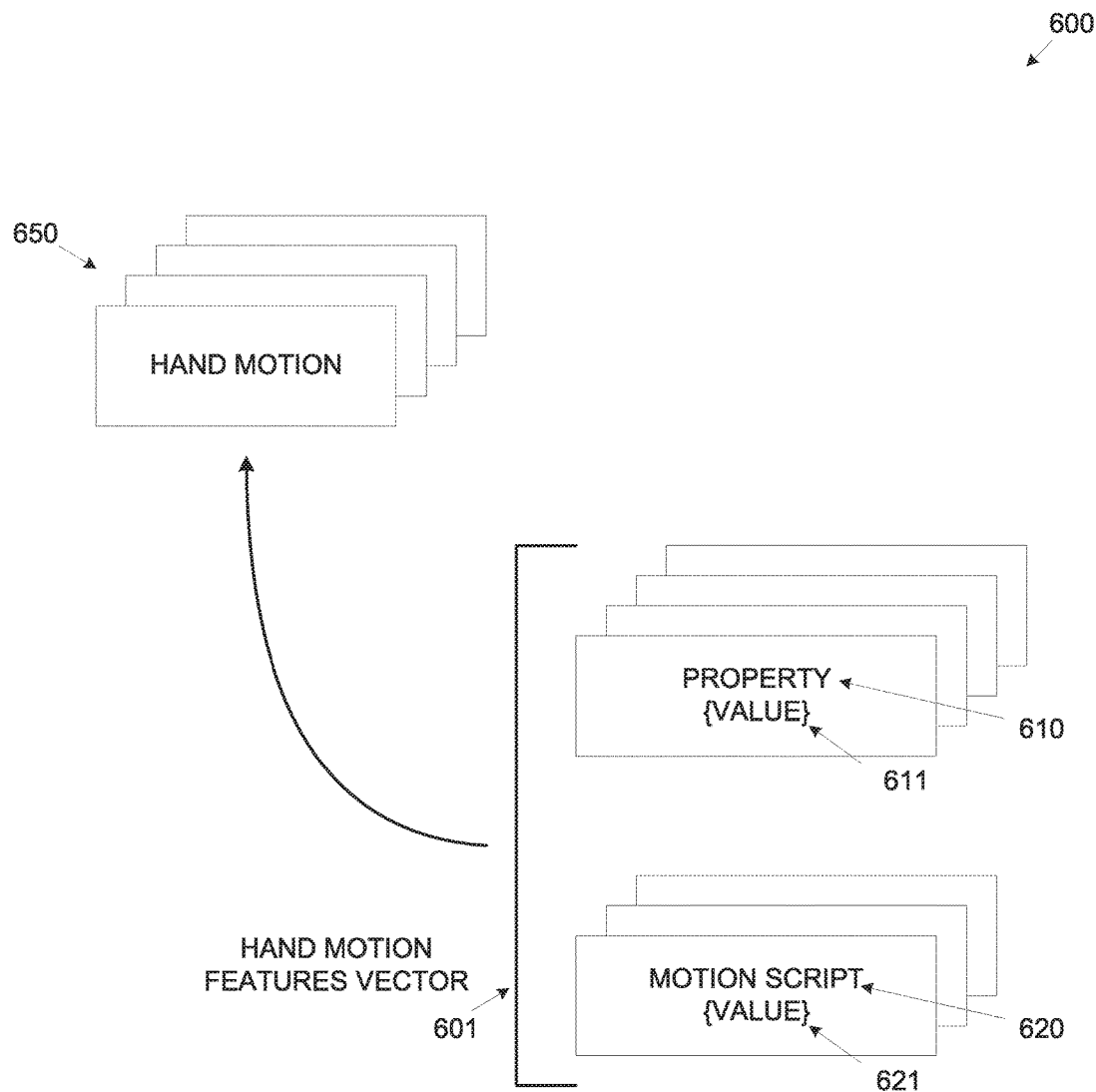
FIG. 6 is a schematic illustration of exemplary hand motions construction as part of a multimodal act, according to some embodiments of the present disclosure.

Reference is now made to FIG. 6 which is a schematic illustration of exemplary hand motions construction, according to some embodiments of the present disclosure. Illustration 600 depicts exemplary hand motions 650 representations construction. Each of the hand motions 650 is represented as a hand motion features record 601 which includes one or more hand motion features 610 and/or 620. Each of the hand motion features 610 and/or 620 may be assigned with one or more discrete motion values 611 and 621 which identify the state (value) of the respective hand motion feature 610 and 620 for an associated hand motion of the hand motions 650. Continuous values of the one or more hand motion features 610 and/or 620 may be represented by the discrete motion values 611 and/or 621 by quantizing the continuous values. The hand motion features record 601 identifies a specific motion of a hand which may later be used by a programmer to create one or more hand gestures such as the hand gestures 110. The hand motion features record 601 may be represented as, for example, a features vector, a features matrix and/or a features table. The hand motion features record 601 may include one or more of the following hand motion features 610 and/or 620:

Motion property features—one or more motion property features 610 may include, for example, motion size 610A, motion speed 610B and/or motion location 610C. Motion size 610A may identify the size (scope) of the motion, and may be defined by discrete motion values 611A such as, for example, small, normal and/or large. Motion speed 610B may identify the speed of the motion and may be defined by discrete motion values 611B such as, for example, slow, normal, fast and/or abrupt. Motion location 610C may identify the spatial location in which the motion is performed, and may be defined by discrete motion values 611C such as, for example, center of FOV, right side of FOV, left side of FOV, top of FOV, bottom of FOV, front of FOV and/or rear of FOV. Optionally, hand location 610C is expressed with respect to a fixed object present in the FOV, for example, keyboard and/or pointing device so that relative hand location feature 610C may include discrete motion values 611C such as, for example, above_keybord, behind_keyboard, right_of_keyboard and/or left_of_keyboard.

Motion script features—one or more motion script features 620 may define the actual motion performed and/or hand trajectory. The motion script values 620 may include, for example, motion direction 620A, motion start point 620B, motion end point 620C and/or pre-defined curve shapes 620D. The motion direction feature 620A may include discreet motion values such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left downward, counter_clockwise_arc_right_upward, counter_clockwise_arc_right_downward, counter_clockwise_arc_left_upward and/or counter_clockwise_arc_left_downward. The motion curve shapes 620D may include for example discrete motion values 621D such as, for example, at-sign (@), infinity sign (∞), digit signs, alphabet signs and the likes. Optionally, additional one or more curve shapes 621D may be created as pre-defined curves, for example, checkmark, bill request and the likes as it is desirable to use hand gestures which are intuitive and publically known, for example, at-sign for composing and/or sending an email, checkmark sign for a check operation and/or a scribble for asking for a bill. The one or more curve shapes may optionally be created using a freehand tool in the format of, for example, scalable vector graphics (SVG). Each of the motion script features 620 is defined for a 2D plane, however each of the motion script features 620 may be transposed to depict another 2D plane, for example, X-Y, X-Z and/or Y-Z. Optionally, the motion script features 620 define three dimensional (3D) motions and/or curves using a 3D image data representation format.

Each one of the hand motions 650 is defined by a unique one of the hand motion features records 601 which may a combination and/or sequence of one or more discrete motion values 611 and/or 621 each providing a value of the corresponding hand motion feature 610 and/or 620. Using the discrete motion values 611 and/or 621 allows for simple creation of the hand motions 650 as there is a finite number of discrete motion values 611 and/or 621 with which the hand motion 650 is created. For instance the motion speed feature 610B included in the hand motion property feature 610 may include up to four discrete motion values 611B—slow, normal, fast and abrupt. The discrete representation of the hand motion features 610 and/or 620 may not be limited to discrete values only, continuous values of the one or more hand motion features 610 and/or 620 may be represented by discrete motion values 611 and/or 621 respectively by quantizing the continuous values. For example, the motion speed motion feature 610B may be defined with 6 discrete motion values 611B1-611B6—5 m/s (meter/second), 10 m/s, 15 m/s, 20 m/s, 25 m/s and 30 m/s to quantize the motion speed of a normal human hand of 0 m/s-30 m/s. One or more hand motions 650 may be created and included in one or more hand gestures such as the hand gestures 110 which may be used to create multimodal acts such as the multimodal acts 105.

Figure 7:
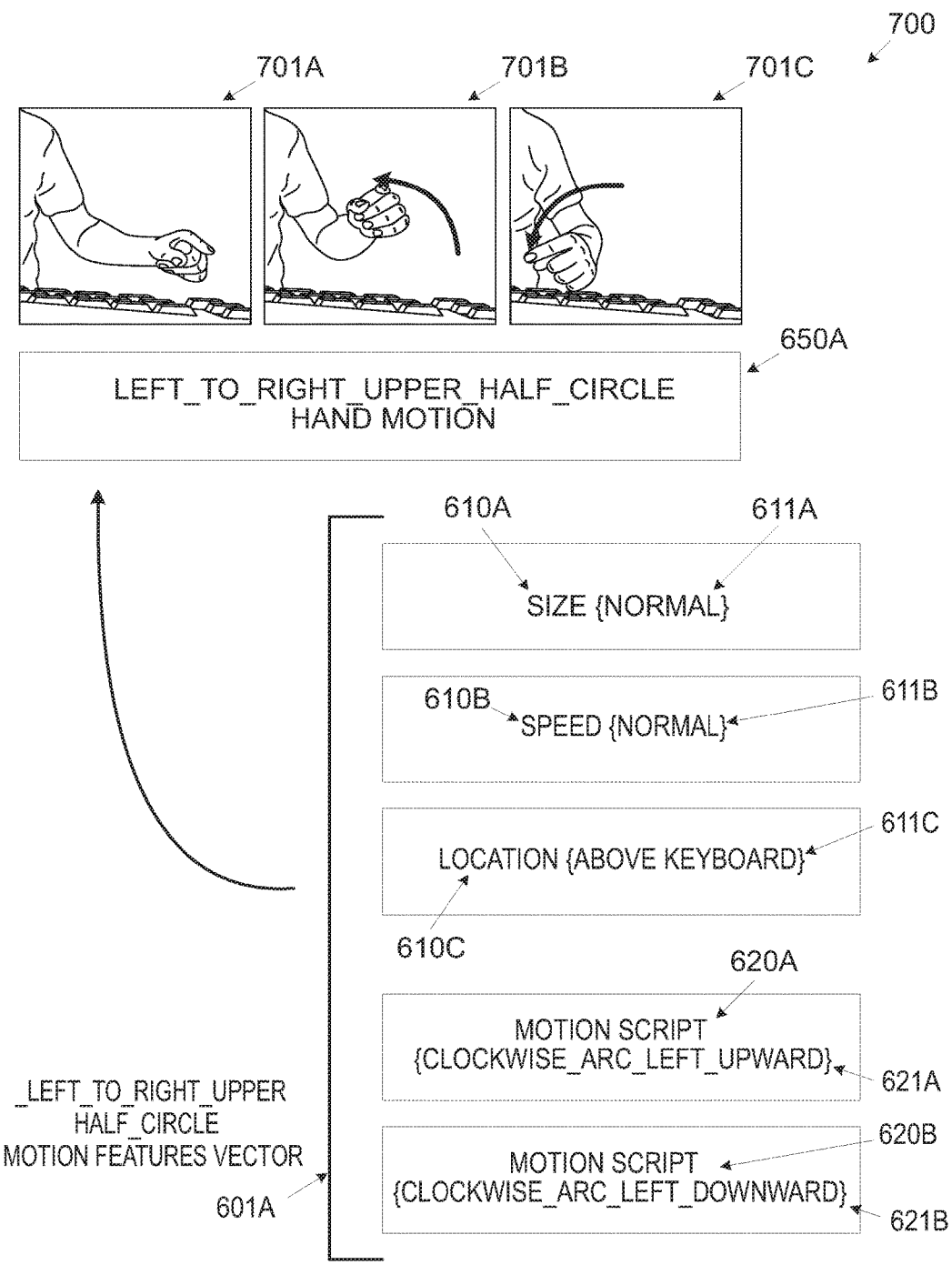
FIG. 7 is a schematic illustration of an exemplary half circle hand motion construction, according to some embodiments of the present disclosure.

Reference is now made to FIG. 7 which is a schematic illustration of an exemplary half circle hand motion construction using a gestures visual builder tool, according to some embodiments of the present disclosure. Illustration 700 depicts an exemplary left_to_right_upper_half_circle hand motion 650A construction by a left_to_right_upper_half circle hand motion features record 601A comprising a plurality of discrete motion values such as the discrete motion values 611 and/or 621, each indicating a corresponding hand motion feature such as the hand motion features 610 and/or 620. The left_to_right_upper_half_circle hand motion 650A which is visualized through image captures 701A, 701B and 701C is created with some of the plurality of discrete motion values 621 and/or 621 as follows:

A motion size feature 610A is assigned a discrete motion value 611A to indicate the motion size is normal.

A motion speed feature 610B is assigned a discrete motion value 611B to indicate the motion speed is normal.

A motion location feature 610C is assigned a discrete motion value 611C to indicate the motion is performed above a keyboard.

A first motion script feature 620A is assigned a discrete motion value 621A to indicate a motion shape of clockwise_arc_left_upward as presented by the image capture 701B.

A second motion script feature 620B is assigned a discrete motion value 621B to indicate a motion shape of clockwise_arc_left_downward as presented by the image capture 701C.

As seen above, the left_to_right_upper_half_circle motion 650A is uniquely defined by a left_to_right_upper_half_circle motion features record 601A comprising of the discrete motion values 611A-611C and 621A-621B corresponding to the hand motion features 610A-610C and 620A-620B respectively. Similarly additional hand and/or finger(s) motion may be created.

Figure 8:
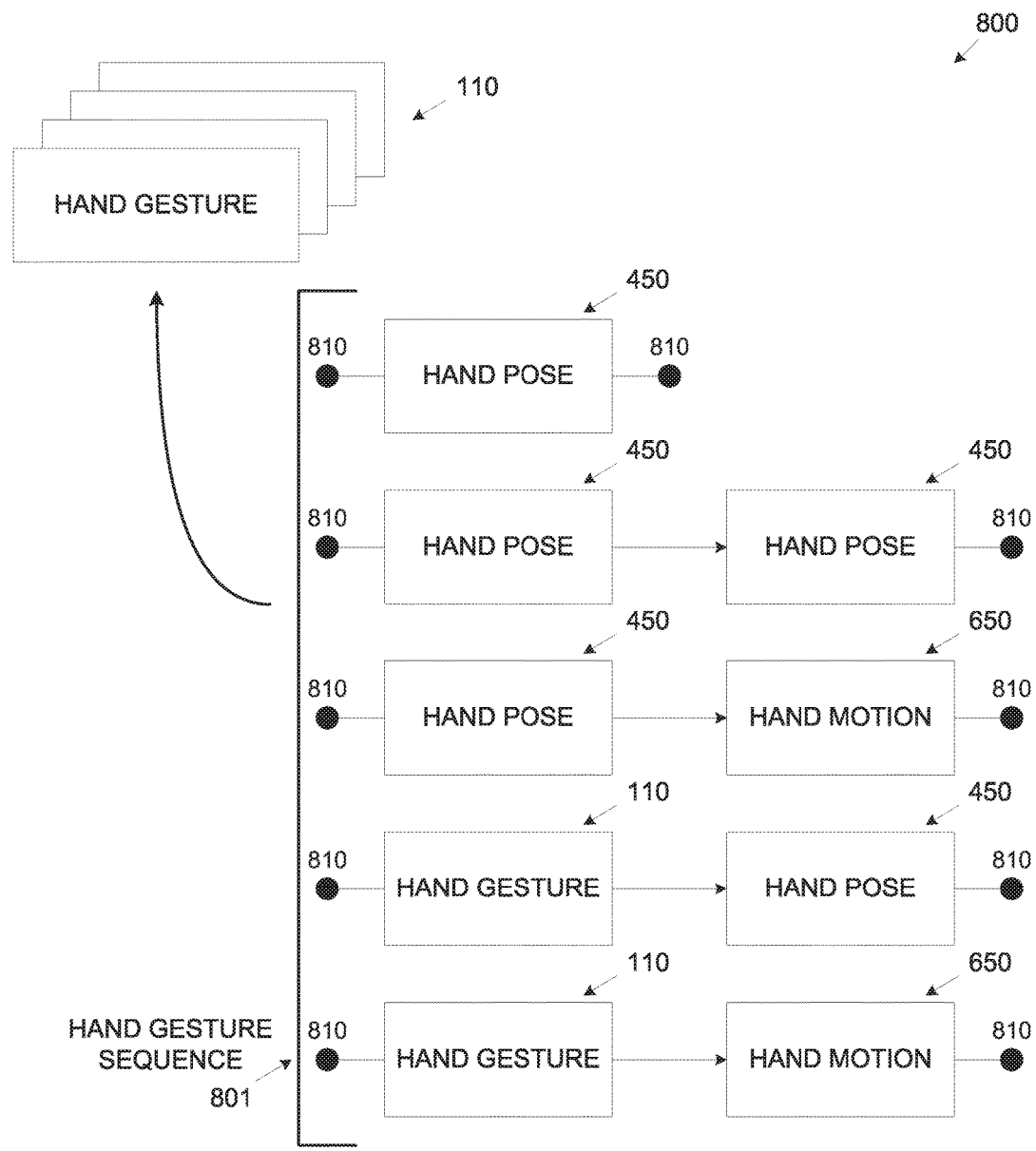
FIG. 8 is a block diagram of the building blocks of exemplary hand gestures as part of a multimodal act, according to some embodiments of the present disclosure.

Reference is now made to FIG. 8 which is a block diagram of the building blocks of an exemplary hand gesture as part of a multimodal act, according to some embodiments of the present disclosure. Illustration 800 depicts several construction schemes of exemplary hand gestures (representation) such as the hand gestures 110. The hand gestures 110 may be created through one or more possible constructions, for example:

(a) The hand gesture 110 may consist of a hand pose, such as one of the hand poses 450.

(b) The hand gesture 110 may be a combination and/or sequence of two of the hand poses 450.

(c) The hand gesture 110 may be a combination and/or sequence of one of the hand poses 450 and a hand motion, such as one of the hand motions 650.

(d) The (first) hand gesture 110 may be a combination and/or sequence of a second hand gesture 110 and one of the hand poses 450. The second hand gesture 110 may be the same one as the first hand gesture 110 or a different one of the hand gestures 110.

(e) The (first) hand gesture 110 may be a combination and/or sequence of a second hand gesture 110 and one of the hand motions 650. The second hand gesture 110 may be the same one as the first hand gesture 110 or a different one of the hand gestures 110.

The hand gesture 110 may be a complex hand gesture 110 created through multiple iterations of the constructions (d) and/or (e) above. Each hand gesture 110 is constructed as a unique combination and/or sequence represented by a logical hand gesture sequence, such as the hand gesture sequence 801 which comprises of one or more of the: hand poses 450, hand motions 650 and/or hand gestures 110. Each of the hand gestures 110 starts and ends with an idle state 810 which is a virtual state identifying the start and/or end of the unique hand gesture sequence 801 of the hand gesture 110.

Figure 9:
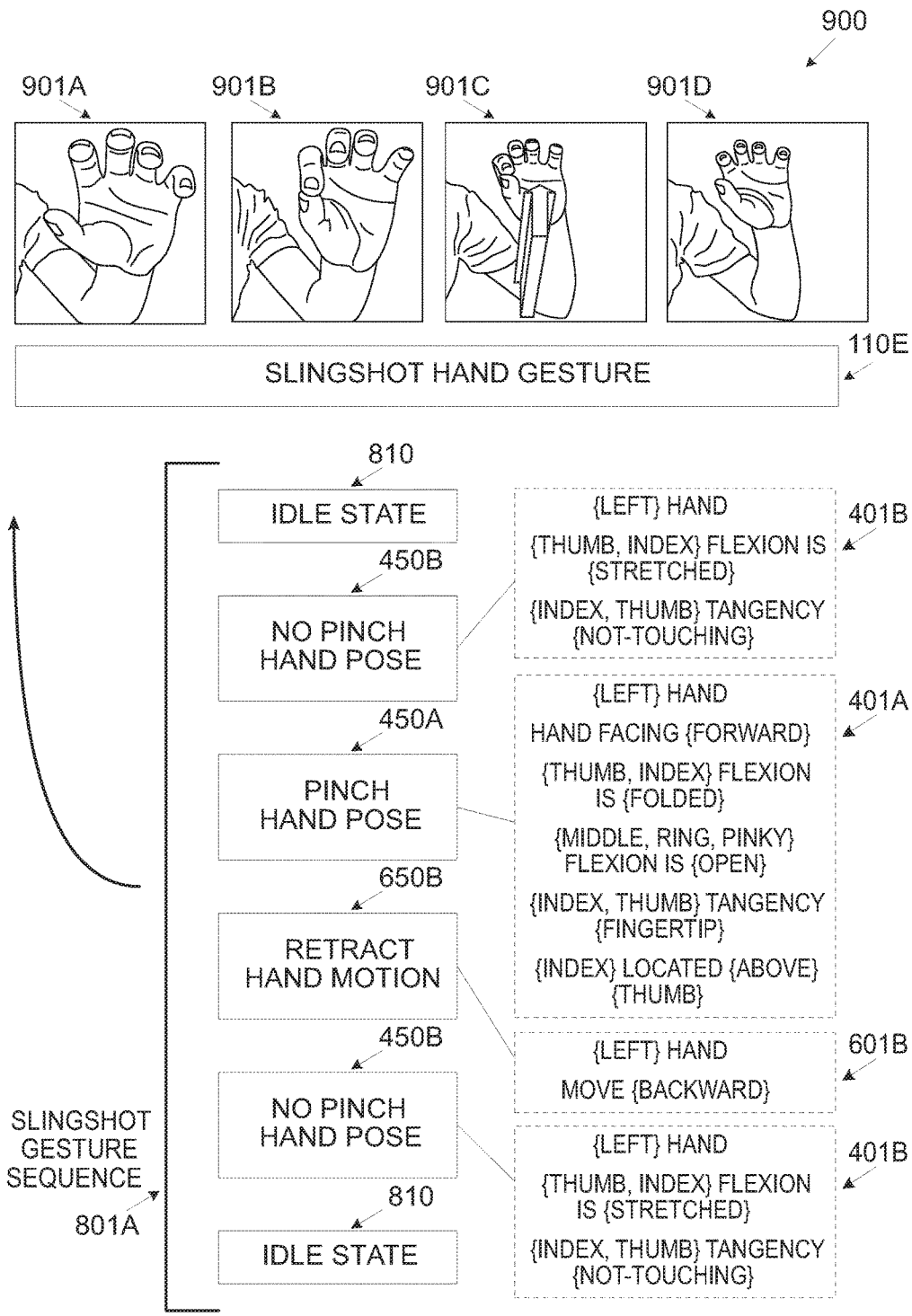
FIG. 9 is a block diagram of the building blocks of an exemplary slingshot hand gesture, according to some embodiments of the present disclosure.

Reference is now made to FIG. 9 which is a block diagram of the building blocks of an exemplary slingshot hand gesture, according to some embodiments of the present disclosure. Illustration 900 depicts an exemplary slingshot hand gesture 110E construction as a logical hand gesture sequence 801A such as the hand gesture sequence 801 which comprises hand poses such as the hand poses 450 and hand motions such as the hand motions 650. The slingshot hand gesture 110E which is visualized through image captures 901A, 901B, 901C and 901D is constructed of a combination and/or sequence of a no pinch hand pose 450B, a pinch hand pose such as the pinch hand pose 450A and a retract hand motion 650B. The sequence of the slingshot hand gesture 110E is as follows:

An idle state such as the virtual idle state 810 defines the starting state and/or point of the sequence of the slingshot hand gesture 110E.

A no pinch hand pose 450B defined by a hand pose features record 401B represents no pinching action as depicted in image capture 901A.

A pinch hand pose 450A defined by the hand pose features record 401A in which a pinch action is identified as depicted in image capture 901B.

A retract motion 650A defined by a hand motion features record 601B in which the hand is moved backwards as is depicted in image capture 901C.

A no pinch hand pose 450B defined by the hand pose features record 401A represents the pinch pose is released and identified as no pinching action as depicted in image capture 901D.

An idle state 810 defines the end state and/or point of the sequence of the slingshot hand gesture 110E.

The sequence of the slingshot hand gesture 110E as described above is represented through the unique logical slingshot hand gesture sequence 801A which may be utilized as, for example, a gesture FSM. For any of the hand poses 450 and/or hand motions 650 only relevant discrete pose and/or motion values may be defined, as is evident, for example, the no pinch hand pose features record 401B in which the hand selection discrete pose value 411 (left), the finger flexion discrete pose value 421 (stretched) and the finger tangency discrete pose value 431 (not touching) are defined for the no pinch hand pose 450B. Other discrete pose values which are irrelevant to distinguishing between the no pinch hand pose 450B from the pinch hand pose 450A are left free and are not specified. Specifying only the relevant discrete pose and/or motion values allows for several degrees of freedom in the articulation of the hand poses 450 and/or hand motions 650 as performed by different one or more users at runtime. This means each of the one or more users may perform the hand pose 450 and/or hand motion 650 slightly differently and yet they are still recognized, identified and/or classified the same.

Figure 10:
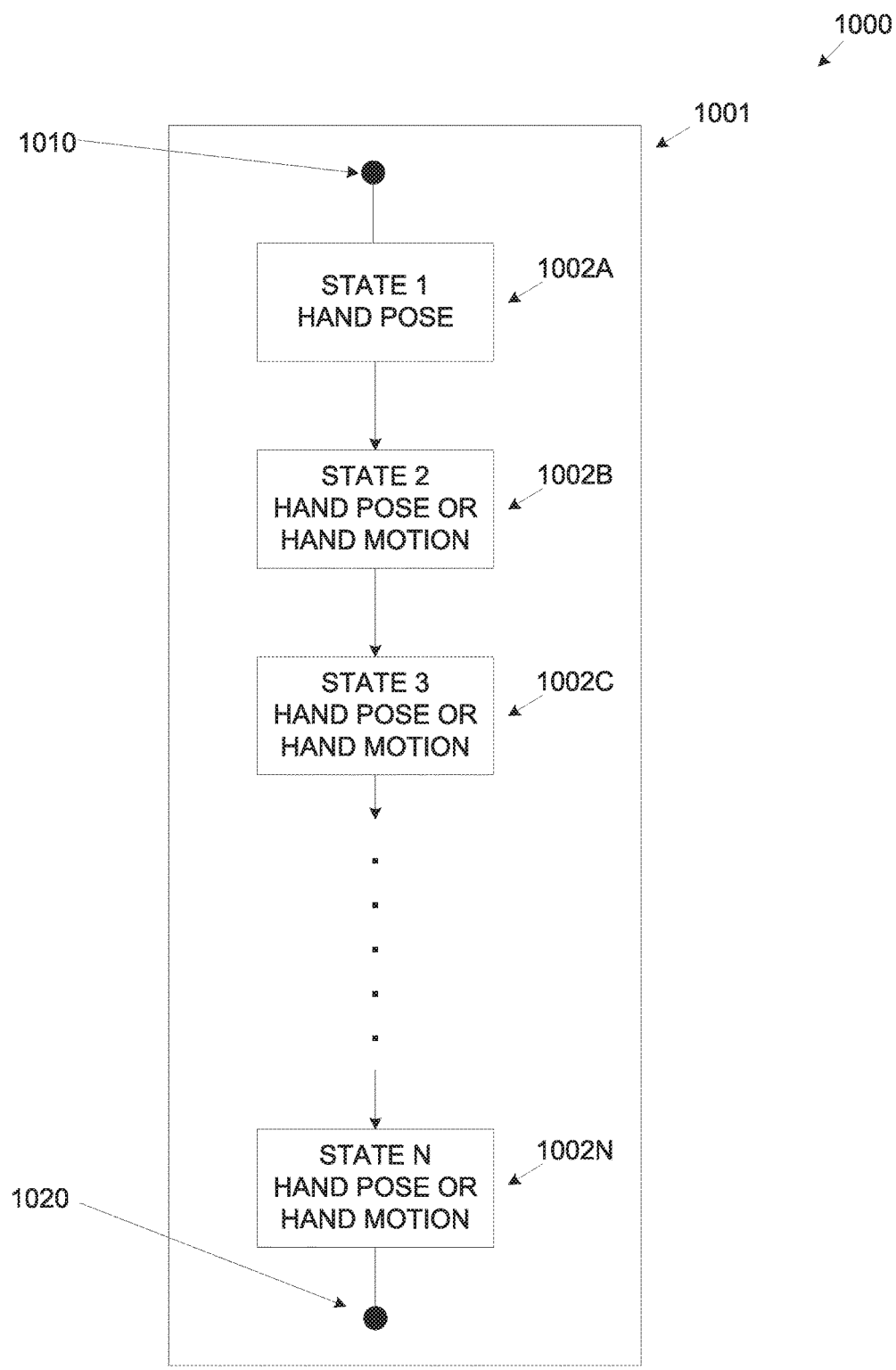
FIG. 10 is a schematic illustration of a gesture FSM defining a multimodal act, according to some embodiments of the present disclosure.

Reference is now made to FIG. 10 which is a schematic illustration of a gesture FSM defining hand gestures by a sequence of hand motions and hand poses, according to some embodiments of the present disclosure. An illustration 1000 depicts a gesture FSM 1001 which may represent a hand gesture sequence such as the hand gesture sequence 801. The gesture FSM 1001 starts with a start point 1010 which may be a virtual state indicating an idle state of the FSM 1001 and may include one or more states 1002A, 1002B, 1002C through 1002N. The first state 1002A is a hand pose which is a start of a sequence representing a hand gesture such as the hand gesture 110. Each of the succeeding states 1002B-1002N may be either a hand pose such as the hand poses 450 or a hand motion such as the hand motions 650. The gesture FSM 1001 is ended with an end point 1020. The start point 1010 and/or the end point 1020 may be defined by a virtual idle state such as the idle state 810. Optionally, the FSM 1001 may be constructed to represent a complex hand gestures such as the hand gestures 110 by including repetitions of one or more of the states 1002A-1002N, splitting to several parallel and/or sequential paths and/or combining two or more FSMs 1001 and/or parts thereof.

Using the gesture FSM 1001 to represent each of the plurality of hand gestures 110, significantly simplifies the analysis process for recognizing, identifying and/or classifying the one or more hand gestures 110 (which are part of one or more multimodal acts such as the multimodal acts 105) during the runtime execution of the application in order to trigger the one or more application function associated with the one or more multimodal acts 105. Recognition, identification and/or classification are simplified since the gesture FSM 1001 includes a finite number of states each constructed of a hand pose features record and/or hand motion features records such as the hand pose features record 401 and/or hand motion features record 601. By using the discretely constructed hand pose features records 401 and/or hand motion features records 601 there is no need for intensive hand skeleton modeling thus reducing the level of computer vision processing. Furthermore computer learning is completely avoided as the one or more hand poses 450 and hand motion 650 are not learned in advance but rather identified in real time using analysis processes such as, for example DFE and/or DTE which is made possible due to their discrete construction. Optionally, any transition in the FSM 1001 may trigger an event in the system which may be logged and used for one or more of a plurality of uses, for example, use of a respective application (the application which includes the associated one or more application functions), use of other one or more applications and/or use of an OS controlling the execution environment.

Figure 11:
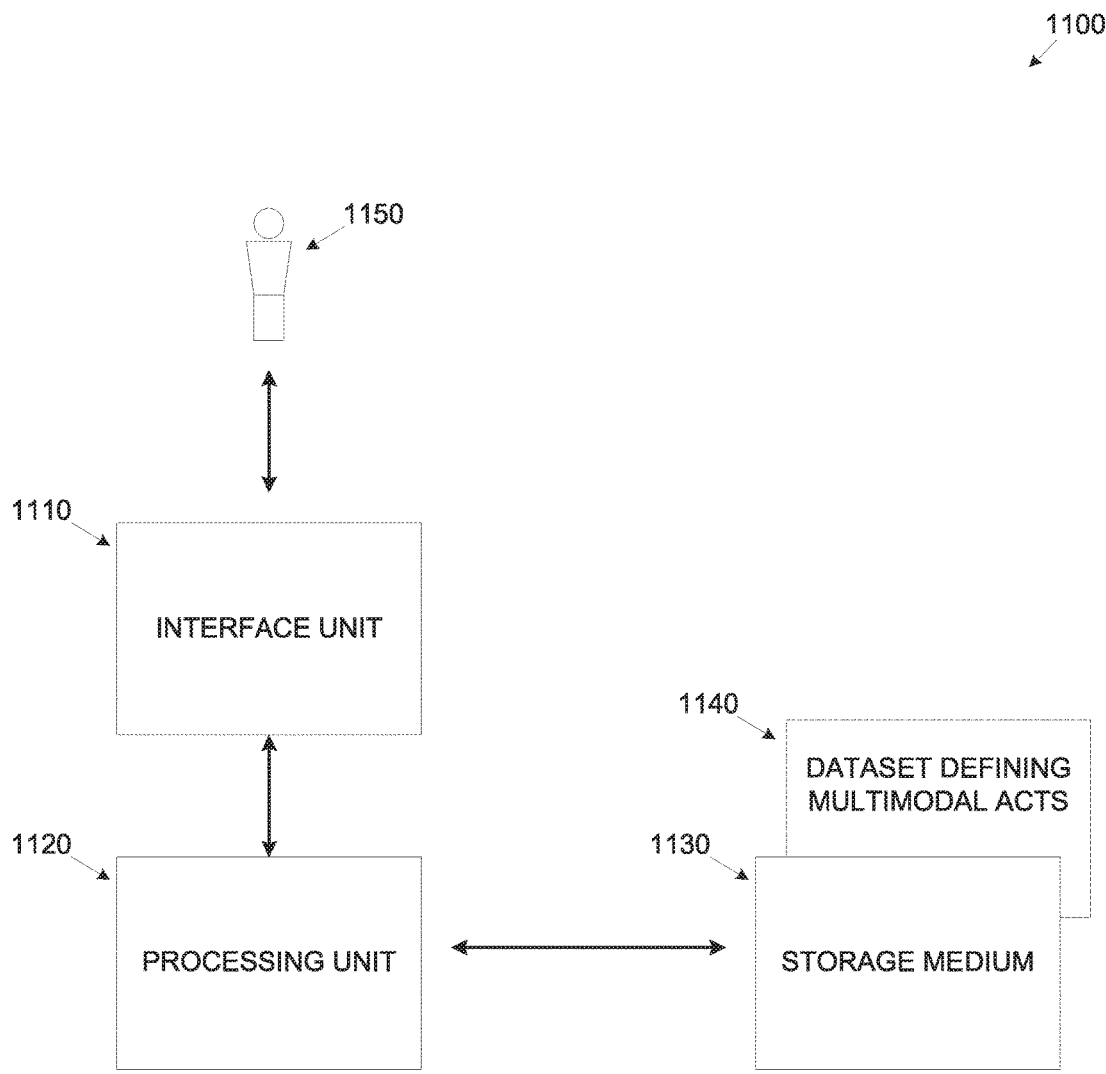
FIG. 11 is a schematic illustration of an exemplary system for associating multimodal acts with application functions, according to some embodiments of the present disclosure.

Reference is now made to FIG. 11 is a schematic illustration of an exemplary system for associating multimodal acts with application functions, according to some embodiments of the present disclosure. An exemplary system 1100 includes an interface unit 1110 for interacting with a programmer 1150, one or more hardware processors 1120 for associating one or more multimodal acts such as the multimodal acts 105 with one or more application functions based on code instructions provided by the programmer 1150 and a storage medium 1130 for storing a dataset 1140 of the plurality of multimodal acts 105. Optionally, the interface unit 1110 may be implemented by, for example, an integrated development environment (IDE) tool and/or a graphic user interface (GUI). The interface unit 1110 may include additional user interaction capturing devices, for example, an imaging device(s), an audio recorder(s), a tactile reception device(s), a text input device(s) and/or a pointing device(s) to allow the programmer 1150 to define visual, audible, textual and/or tactile directives to create one or more of the multimodal acts 105.

The programmer 1050 may create one or more software applications which include one or more application functions and define one or more multimodal acts 105 which are associated with the one or more application functions. The multimodal acts 105 may be each represented by an FSM such as the FSM 201 which defines a multimodal sequence such as the multimodal sequence 101. The multimodal acts 105 may be available from the dataset 1140 and/or may be created by the programmer 1150. The processor 1120 processes the instructions received from the programmer 1150 through the interface unit 1110 and performs the actual association between the one or more application functions and the 1110 and the one or more multimodal acts 105. Association between the one or more application functions and the multimodal acts 105 is done through, for example, a multimodal API, a GUI, a web service and/or the like. A set of pre-defined multimodal acts 105 may be available, for example, to an IDE tool through a multimodal library employing a multimodal API so that the IDE tool may allow the programmer 1150 to add API calls which link to multimodal libraries at built time prior to execution on a target computerized device. The target computerized device may be, for example, a processor based device such as a laptop, a desktop, a server, a mobile device, such as a tablet, a smartphone or a wearable device including a Smartwatch or Smartglasses, computerized machine and/or any computerized appliance, for instance a home appliance. Optionally, the multimodal library and the multimodal API are available for runtime linking as a plugin module which may dynamically link to the software application during runtime execution on the target computerized device in real time. Optionally, the programmer 1150 creates one or more custom multimodal acts such as the multimodal acts 105 using the multimodal library and/or the multimodal API available by the IDE tool, the GUI, a custom multimodal acts builder, a web based service and the likes.

Figure 12:
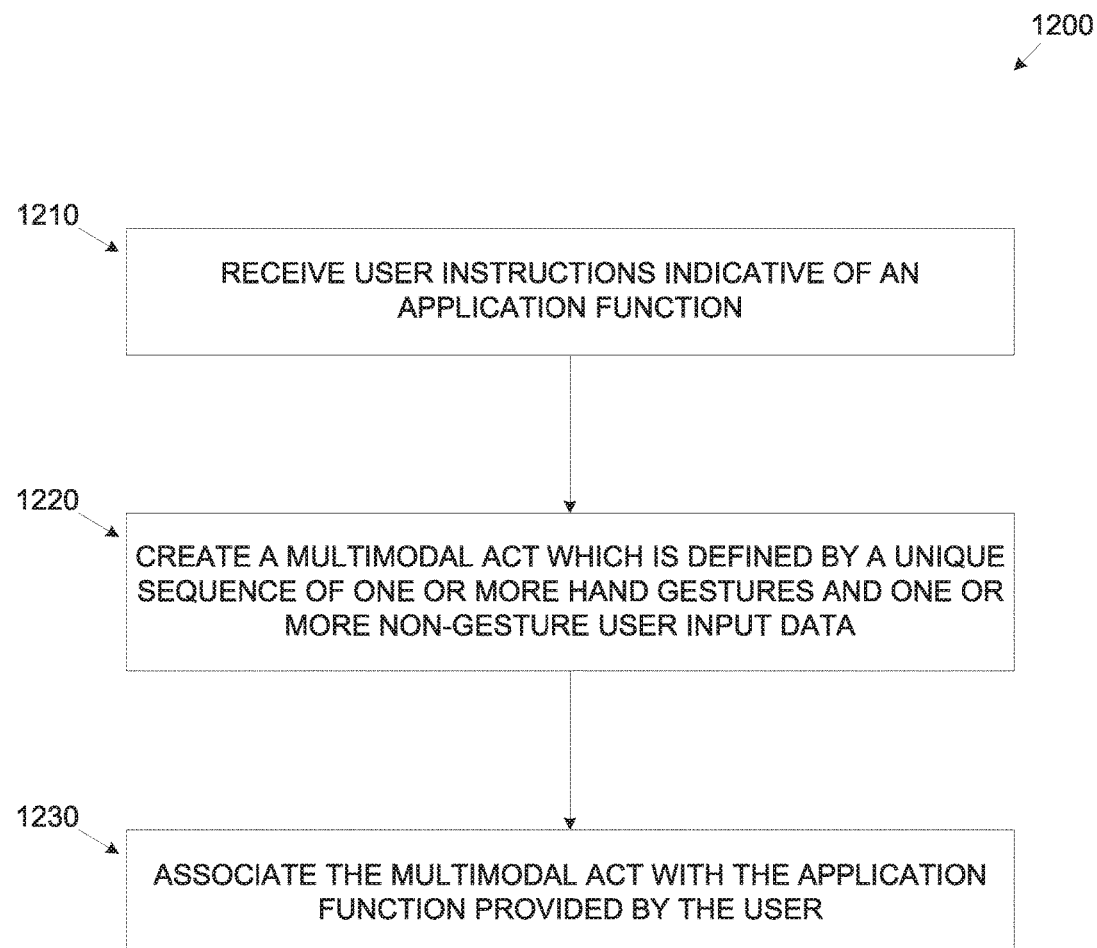
FIG. 12 is a flowchart of an exemplary process for associating multimodal acts with application functions, according to some embodiments of the present disclosure.

Reference is now made to FIG. 12 which is flowchart of an exemplary process for associating multimodal acts with application functions, according to some embodiments of the present disclosure. An exemplary process 1200 is executed in a system such as the exemplary system 1100. As shown at 1210, the exemplary process 1200 starts with receiving one or more user instructions from a programmer such as the programmer 1150 using for example, an IDE tool and/or a GUI for interacting with a multimodal API of a multimodal library. The one or more instructions indicate one or more application functions to be associated with one or more multimodal acts such as the hand multimodal acts 105. As shown at 1020 the one or more hand multimodal acts 105 are constructed by creating a unique logic sequence such as the multimodal sequence 101 containing one or more multimodal actions such as, for example, hand gestures such as the hand gestures 110 and/or non-gesture input such as the non-gesture input 160. The one or more multimodal acts 105 may be created per instructions of the programmer 1150 and/or may be predefined and available to the programmer 1150 available, for example, in a multimodal library such as, for example, the dataset 1140 and/or at other databases and/or libraries available in one or more storage medium devices located locally and/or at one or more remote locations. As shown at 1230, after the required one or more multimodal acts 105 are created they are associated with the one or more application functions as indicated by the programmer 1150. Optionally, dynamic linking of the multimodal library is supported through a dynamic link library (DLL), for example, a plugin that is loaded to the target computerized device to be linked with the one or more application functions in runtime. The multimodal library and/or the runtime plugin may employ a multimodal API to support a common interface allowing the programmer 1150 easy association of the one or more multimodal acts 105 with the one or more application functions.

It is expected that during the life of a patent maturing from this application many relevant HMI and/or NMI will be developed and the scope of the term HMI and/or NMI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand gesture" or "at least hand gesture" may include a single hand gesture and/or two hands gestures.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there are provided systems for associating between a computerized model of multimodal human interaction and one or more application function. The system comprises of an interface for receiving instructions from a programmer defining one or more of a plurality of application functions of an application, a storage storing a plurality hand gestures each defined by a dataset of some of a plurality of discrete pose values and a plurality of discrete motion values, a memory storing a code and one or more processors coupled to the interface, the storage and the memory for executing the stored code. The code comprises code instructions to define a logical sequence of user input per instructions of the programmer and code instructions to associate the logical sequence with one or more of the application functions for initiating an execution of the one or more functions during runtime of the application and in response to detection of the logical sequence from an analysis of captured data depicting a user during runtime. The logical sequence combines one or more of the plurality of hand gestures with one or more non-gesture user input.

Each of the one or more hand gestures is defined by a gesture sequence comprising one or more of a plurality of hand pose features records and a plurality of hand motion features records. Each of the plurality of hand pose features records is defined by a unique set of one or more of the plurality of discrete pose values. Each one of the plurality of hand motion features records is defined by a unique set of one or more of the plurality of discrete motion values.

The gesture sequence is defined by a gesture FSM model.

The non-gesture user interaction is a member of a group consisting of: a text input, a visual element selection, a tactile input and/or a voice input.

The logical sequence is defined by a multimodal FSM model.

Optionally, an event is generated during one or more transitions of the multimodal FSM from one state to another state.

According to some embodiments of the present disclosure there is provided a computer implemented method for associating between a computerized model of multimodal human interaction and one or more application function. The method employs an application code executed on one or more processors for accessing a memory storing a plurality of hand gestures, receiving instructions from a programmer to create a logical sequence of user input and associating the logical sequence with one or more application functions per instructions of the programmer for initiating an execution of the one or more application function during runtime of the application and in response to detection of the logical sequence from analysis of captured data depicting a user during said runtime. Each of the plurality of hand gestures is defined by a dataset of some of a plurality of discrete pose values and a plurality of discrete motion values. The logical sequence of user input combines one of the plurality of hand gestures with at one or more non-gesture user input.

The plurality of hand gestures is defined by a gesture sequence comprising one or more of a plurality of hand pose features records and a plurality of hand motion features records. Each one of the plurality of hand pose features records is defined by a unique set of one or more of the plurality of discrete pose values. Each one of the plurality of hand motion features records is defined by a unique set of one or more of the plurality of discrete motion values.

The gesture sequence is defined by a gesture FSM model.

The non-gesture user interaction is a member of a group consisting of: a text input, a visual element selection, a tactile input and/or a voice input.

The logical sequence is defined by a multimodal FSM model.

Optionally, an event is generated during one or more transitions of the multimodal FSM from one state to another state.

According to some embodiments of the present disclosure there is provided a software program product for associating between a computerized model of multimodal human interaction and one or more application functions stored in a non-transitory computer readable storage medium. The software program product comprises first program instructions to access a storage storing a plurality of hand gestures, second program instructions to receive instructions from a programmer to create a logical sequence of user input and third program instructions to associate the logical sequence with one or more application function per instructions of the programmer for initiating execution of the one or more application functions during runtime of the application and in response to detection of the logical sequence from analysis of captured data depicting a user during runtime. Each of the plurality of hand gestures is defined by a dataset of some of a plurality of discrete pose values and a plurality of discrete motion values. The logical sequence of user input combines one of the plurality of hand gestures with at one or more non-gesture user input. The first, second and third program instructions are executed by one or more computerized processors from the non-transitory computer readable storage medium.

Each of the one or more hand gestures is defined by a gesture sequence comprising one or more of a plurality of hand pose features records and a plurality of hand motion features records. Each of the plurality of hand pose features records is defined by a unique set of one or more of the plurality of discrete pose values. Each one of the plurality of hand motion features records is defined by a unique set of one or more of the plurality of discrete motion values.

The gesture sequence is defined by a gesture FSM model.

The non-gesture user interaction is a member of a group consisting of: a text input, a visual element selection, a tactile input and/or a voice input.

The logical sequence is defined by a multimodal FSM model.

Optionally, the software program product includes fourth program instructions to generate an event during one or more transitions of the multimodal FSM from one state to another state.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A system for associating between a computerized model of multimodal human interaction and at least one application function, comprising:

an interface configured to receive instructions from a programmer defining at least one of a plurality of application functions of an application having an application code;

a storage configured to store a plurality hand gestures in a three dimensional (3D) space, each one of said plurality hand gestures is defined by a dataset defining a spatial orientation of a hand of a human by at least one of a plurality of discrete pose values and at least one of a plurality of discrete motion values;

a memory configured to store a code;

at least one processor coupled to said interface, said storage and said memory, said at least one processor is configured to execute the stored code, the code comprising:

code instructions to define a logical sequence of user input per instructions of said programmer, said logical sequence combining at least one of said plurality of hand gestures with at least one non-gesture user input; and code instructions to generate a multimodal act code for said application, said multimodal act code associates said logical sequence with said at least one application function;

code instructions to add said multimodal act code to said application code at a built time prior to execution of said application code by a target computerized device;

wherein an execution of said multimodal act code by said target computerized device triggers said at least one application function in response to a detection of said logical sequence from an analysis of data captured using at least one capturing unit of said target computerized device, said data documents user interactions during runtime of said application.

2. The system of claim 1, wherein said at least one hand gesture is defined by a gesture sequence comprising at least one of: a plurality of hand pose features records and a plurality of hand motion features records, each one of said plurality of hand pose features records is defined by a unique set of at least one of said plurality of discrete pose values and each one of said plurality of hand motion features records is defined by a unique set of at least one of said plurality of discrete motion values.

3. The system of claim 2, wherein said wherein said gesture sequence is defined by a gesture finite state machine (FSM) model.

4. The system of claim 1, wherein said non-gesture user interaction is a member of a group consisting of: a text input, a visual element selection, a tactile input, and a voice input.

5. The system of claim 1, wherein said logical sequence is defined by a multimodal FSM model.

6. The system of claim 5, further comprising an event is generated to said system during at least one transition of said multimodal FSM from one state to another state.

7. A computer implemented method for associating between a computerized model of multimodal human interaction and at least one application function, comprising:
   accessing a memory configured to store a plurality of hand gestures in a three dimensional (3D) space, each one of said plurality hand gestures is defined by a dataset defining a spatial orientation of a hand of a human by at least one of a plurality of discrete pose values and at least one of a plurality of discrete motion values;
   receiving instructions from a programmer to create for an application having an application code, using at least one processor, a logical sequence of user input that combines at least one of said plurality of hand gestures with at least one non-gesture user input; and
   generating, using said at least one processor, a multimodal act code for said application, said multimodal act code associates said logical sequence with at least one application function per instructions of said programmer;
   adding said multimodal act code to said application code at a built time prior to execution of said application code by a target computerized device;
   wherein an execution of said multimodal act code by said target computerized device triggers said at least one application function in response to a detection of said logical sequence from an analysis of data captured using at least one capturing unit of said target computerized device, said data documents user interactions during runtime of said application.

8. The computer implemented method of claim 7, wherein each of said plurality of hand gestures is defined by a gesture sequence comprising at least one of: a plurality of hand pose features records and a plurality of hand motion features records, each one of said plurality of hand pose features records is defined by a unique set of at least one of said plurality of discrete pose values and each one of said plurality of hand motion features records is defined by a unique set of at least one of said plurality of discrete motion values.

9. The computer implemented method of claim 8, wherein said wherein said gesture sequence is defined by a gesture FSM model.

10. The computer implemented method of claim 7, wherein said non-gesture user interaction is a member of a group consisting of: a text input, a visual element selection, a tactile input, and a voice input.

11. The computer implemented method of claim 7, wherein said logical sequence is defined by a multimodal FSM model.

12. The computer implemented method of claim 11, further comprising an event is generated during at least at one transition of said multimodal FSM from one state to another state.

13. A software program product for associating between a computerized model of multimodal human interaction and at least one application function, comprising:
   a non-transitory computer readable storage medium;
   first program instructions to access a storage configured to store a plurality of hand gestures in a three dimensional (3D) space, each one of said plurality hand gestures is defined by a dataset defining a spatial orientation of a hand of a human by at least one of a plurality of discrete pose values and at least one of a plurality of discrete motion values;
   second program instructions to receive instructions from a programmer to create an application having an application code, a logical sequence of user input that combines at least one of said plurality of hand gestures with at least one non-gesture user input; and
   third program instructions to associate generate a multimodal act code for said application, said multimodal act code associates said logical sequence with at least one application function per instructions of said programmer;
   fourth program instructions to add said multimodal act code to said application code at a built time prior to execution of said application code by a target computerized device;
   wherein an execution of said multimodal act code by said target computerized device triggers said at least one application function in response to a detection of said logical sequence from an analysis of data captured using at least one capturing unit of said target computerized device, said data documents user interactions during runtime of said application;
   wherein said first, second, third, and fourth program instructions are executed by at least one computerized processor from said non-transitory computer readable storage medium.

14. The software program product of claim 13, wherein each of said plurality of hand gestures is defined by a gesture sequence comprising at least one of: a plurality of hand pose features records and a plurality of hand motion features records, each one of said plurality of hand pose features records is defined by a unique set of at least one of said plurality of discrete pose values and each one of said plurality of hand motion features records is defined by a unique set of at least one of said plurality of discrete motion values.

15. The software program product of claim 14, wherein said wherein said gesture sequence is defined by a gesture FSM model.

16. The software program product of claim 13, wherein said non-gesture user interaction is a member of a group consisting of: a text input, a visual element selection, a tactile input, and a voice input.

17. The software program product of claim 13, wherein said logical sequence is defined by a multimodal FSM model.

18. The software program product of claim 17, further comprising an event is generated during at least at one transition of said multimodal FSM from one state to another state.

* * * * *